(12) United States Patent
Holstein et al.

(10) Patent No.: US 8,410,626 B2
(45) Date of Patent: Apr. 2, 2013

(54) SUBMERSIBLE POWER GENERATING PLANT, DRIVEN BY A WATER FLOW

(75) Inventors: Benjamin Holstein, Heidenheim (DE); Norman Perner, Neu-Ulm (DE)

(73) Assignee: Voith Patent GmbH, Heidenheim (DE)

( * ) Notice: Subject to any disclaimer, the term of this patent is extended or adjusted under 35 U.S.C. 154(b) by 358 days.

(21) Appl. No.: 12/733,387

(22) PCT Filed: Dec. 3, 2008

(86) PCT No.: PCT/EP2008/010215
§ 371 (c)(1),
(2), (4) Date: Jul. 12, 2010

(87) PCT Pub. No.: WO2009/077080
PCT Pub. Date: Jun. 25, 2009

(65) Prior Publication Data
US 2010/0295309 A1    Nov. 25, 2010

(30) Foreign Application Priority Data

Dec. 17, 2007 (DE) .......................... 10 2007 061 185

(51) Int. Cl.
  *F03B 13/10* (2006.01)
(52) U.S. Cl. ......................................................... 290/52
(58) Field of Classification Search ....................... 290/52
See application file for complete search history.

(56) References Cited

U.S. PATENT DOCUMENTS

| | | | | |
|---|---|---|---|---|
| 3,143,972 A | * | 8/1964 | Smith et al. | 417/356 |
| 3,209,156 A | | 9/1965 | Struble, Jr. | |
| 4,367,413 A | * | 1/1983 | Nair | 290/52 |
| 4,524,285 A | * | 6/1985 | Rauch | 290/43 |
| 6,267,551 B1 | | 7/2001 | Dentinger | |
| 6,806,586 B2 | * | 10/2004 | Wobben | 290/54 |
| 7,021,905 B2 | * | 4/2006 | Torrey et al. | 417/356 |
| 7,102,249 B2 | * | 9/2006 | Wobben | 290/54 |
| 2006/0055174 A1 | | 3/2006 | Landwehr | |
| 2007/0018459 A1 | | 1/2007 | Williams | |

FOREIGN PATENT DOCUMENTS

| | | | |
|---|---|---|---|
| DE | 102005040807 A1 | * | 3/2007 |
| EP | 1741926 A2 | | 1/2007 |
| EP | 1878912 A1 | | 1/2008 |
| GB | 818441 | | 8/1959 |
| GB | 2050525 A | * | 1/1981 |
| GB | 2225813 A | | 6/1990 |
| JP | 06237554 A | * | 8/1994 |
| WO | WO 2007/017629 A1 | | 2/2007 |

\* cited by examiner

*Primary Examiner* — Joseph Waks
(74) *Attorney, Agent, or Firm* — Farjami & Farjami LLP

(57) ABSTRACT

There is provided a power generation plant for obtaining electrical power from a water flow. The power generation plant includes a revolving unit having a water turbine, a directly driven electrical generator having a coaxial configuration with a generator rotor and generator stator, a gondola housing having a housing part to form a cylindrical internal opening where the generator stator is situated, a support element for supporting the revolving unit which is situated coaxially and radially inside the cylindrical internal opening to bear the generator rotor, and a bearing configuration for the running of the support element in the cylindrical internal opening. The electric generator of the power generation plant is situated asymmetrically in relation to the longitudinal extension of the cylindrical internal opening in the gondola housing and is also displaced toward the support structure carrying the gondola housing.

17 Claims, 4 Drawing Sheets

SUBMERSIBLE POWER GENERATING PLANT, DRIVEN BY A WATER FLOW

This is a U.S. national phase application which is based on, and claims priority from, PCT application Serial No. PCT/EP2008/010215, filed on Dec. 3, 2008, which claims priority from foreign application Serial No. DE 102007061185.6, filed on Dec. 17, 2007 in Germany.

The invention relates to an submersible power generation plant, driven by a water flow, in particular for obtaining electrical power from running water or an ocean current, preferably a tidal flow.

Submersible power generation plants implemented independently of dam structures, which are driven by the kinetic energy of a water flow, in particular an ocean current, represent a great potential for the exploitation of regenerative power sources. Because of the high density of the flow medium, even a low flow velocity of approximately 2 to 2.5 m/s may already be exploited for cost-effective power acquisition. Such flow conditions may either be provided as a tidal flow or other ocean currents may be exploited, which may achieve cost-effectively exploitable velocities in particular at straits.

Flows of this type may drive flow power plants, which have a similar design as wind power plants, i.e., rotors having rotor blades are used as the water turbines. However, other water turbine concepts, such as vertical turbines and tubular turbines, are also conceivable. Furthermore, such freestanding submersible power generation plants according to the species may also be used in running water, in which barrages having water turbines incorporated therein may not be erected because of specifications due to environmental protection or ship traffic.

A fundamental difficulty in the operation of freestanding submersible power generation plants is that their maintenance is complex. To execute a service measure, the water turbine and the electrical generator must be raised above the water level. Because of the dependence on the weather conditions and the waves, floating crane systems are disadvantageous for this task, so that the submersible power generation plants are often implemented as floatable units, which have an anchor on the ocean floor. Floatable units of this type may be designed so that buoyancy to the water surface is possible in case of service. According to an alternative design, the submersible power generation plant comprises a bearing and support structure, in particular a columnar configuration, which stands on the ocean floor and on which a module made of electrical generator and water turbine is typically fastened. If this bearing and support structure is extended up to the water level, it is thus possible to move the power generation plant vertically on this structure in case of maintenance. For this purpose, a lifting mechanism can be associated with the support and bearing structure. In addition to the implementation having a complex design, such a design has the disadvantage that the structures situated above the water level and just beneath it may represent hazardous obstructions for ship traffic.

The above-mentioned maintenance problems result in the demand for designing submersible power generation plants as maintenance-free as possible. Accordingly, it would be desirable to reduce the number of the components used in the drive train for driving an electrical generator. However, the typically slow flow velocities in the ocean result in slow peripheral velocities of water turbines, a high torque being absorbed because of the high density of the driving medium. For the efficient operation of an electrical generator, much higher peripheral speeds are required, so that typically a transmission for increasing speed is interposed between the water turbine and the driven electrical generator. Reference is made for this purpose, for example, to US 2006 055 174 A.

The use of an intermediate transmission is disadvantageous in regard to the reliability, however, as previously described. In addition, a transmission requires a high level of design effort and the use of lubricants, which is disadvantageous for the present application from environmental aspects. Correspondingly, a shaft seal is typically provided on the gondola housing for the driving shaft in front of the shaft mount. A shaft seal of this type is not entirely free of maintenance and often cannot completely prevent the entrance of ambient water into the interior of the power generation plant, so that bilge pumps must be provided in the gondola housing in connection with oil separators.

A transmission-less, submersible power generation plant having a directly driven electrical generator can be inferred from WO 07017629 A1. The use of a rotor pair rotating in opposite directions for absorbing kinetic energy from the ambient flow is disclosed therein, a first rotor being connected in a torsionally rigid manner to the generator stator and a second rotor being connected in a torsionally rigid manner to the generator rotor. However, the problems also exist for the solution proposed in WO 07017629 A1 of sealing the power generation plant using a shaft seal.

An alternative path is proposed by EP 1 741 926 A2. The use of a generator comprising a generator rotor in the form of a hub ring, in which a plurality of permanent magnets is received, is disclosed. The generator rotor is implemented as an external rotor and is supported on both sides of the air gap against a gondola housing hydrostatic bearings. The mount is applied as a combined radial and axial bearing in a V-shape.

In addition to the components of the generator rotor, the hub ring carries the propeller-shaped turbine blades of the power generation plant, which point radially outward. The solution proposed in EP 1 741 926 A2 results in sufficiently high peripheral velocities of the generator because of the large radial construction of the generator. However, the effort which is required for implementing a torsion-resistant structure of the hub ring of the external rotor is disadvantageous in this concept. For this purpose, it is to be ensured that the forces introduced at the linkage point of the turbine blades on the hub ring cannot result in such high torsions that the gap intervals in the air gap vary excessively strongly. In addition, the necessity exists of implementing the bearing shell of the hydrostatic bearing as sufficiently torsion-resistant adjoining the hub ring. In the practical implementation, a hub ring is therefore necessary which is implemented having a large construction in particular in regard to its radial extension and which thus blocks the flow. Accordingly, the possible longitudinal extension of the turbine blades starting from a fixed predetermined total diameter of the power generation plant is reduced. Alternatively, the diameter of the generator can be reduced, which is disadvantageous in regard to the peripheral velocities of the electrical generator, however.

The invention is based on the object of disclosing a power generation plant according to the species, which is distinguished by long service intervals, a low component count, and by an implementation having a simple design.

The object is achieved by the features of independent claim. Advantageous embodiments result from the sub-claims.

To achieve the object, the inventor proceeds from an electrical generator which is driven directly. A multi-pole generator is preferred, in particular a multi-pole synchronous generator in the form of a ring generator. Because of the direct drive, there is a torsionally-rigid connection between a water turbine, which preferably has a propeller-like structure, and the generator rotor. The generator rotor is situated inside the non-revolving part of the power generation plant and thus inside the gondola housing.

The generator rotor is implemented as an internal rotor and is borne by a support element which revolves at least indirectly with the water turbine and accordingly represents a part of the revolving unit. The support element is situated in an internal opening in the gondola housing and runs in this internal opening using a bearing configuration. The bearings of the bearing configuration are preferably water-lubricated and are largely relieved from static, asymmetrical surface pressures, because a buoyant volume is associated with the support element according to the invention. Accordingly, the intermediate area between the support element and the inner wall of the internal opening in the gondola housing is water-flooded. In the simplest case, the access of ambient water into this intermediate area is possible. For one design, sediment seals are provided on the water turbine side or filtered ambient water is supplied to the intermediate area. An outflow toward the surrounding area, which carries sediment outward, preferably arises from the intermediate area. However, bearing configurations are also conceivable which may be flooded by ambient water without additional protective measures.

For a first embodiment of the support element, it is implemented in at least subareas as a hollow cylinder, so that the buoyant volume arises through at least one liquid-tight terminated, hollow internal area in the support element. Alternatively, the hollow can be foamed or filled with a material of lower density. Furthermore, it is conceivable to construct the support element at least partially from materials having a density which is less than that of the ambient medium. Furthermore, the buoyant volume associated with the support element can be implemented by separate buoyant bodies, which are connected in a torsionally rigid manner at least indirectly to the support element. Support elements of this type preferably assume essentially no bearing function. For this case, the support element does not have to terminate a volume area and can be implemented as a strut frame at least in areas.

A part of the power generation plant, whose buoyancy relieves the bearing configuration, is particularly preferably provided by the implementation of the support element and the revolving components connected thereto. Because of this measure, robust, water-lubricated bearings may be used. These are preferably water-lubricated friction bearings, which do not require special encapsulation. In addition, a friction surface of such a bearing can be implemented in a cylindrical section of the radial external wall of the support element or the radial internal wall of the internal opening in the gondola housing.

Through the buoyant effect of the support element in connection with a large-area construction of the bearing surfaces, the mixed-friction area for friction bearings can be run through rapidly. The startup behavior improves at the same time. Alternatively, the bearing configuration can comprise bearings having a sacrificial lubrication, whereby the bearing configuration can comprise roller bearings. For this case, the bearings have water washing around them, the water essentially not entering the bearings because of the sacrificial lubrication.

Furthermore, not only is influence taken on the absolute value of the resulting force by the setting of the buoyancy and/or the weight force of the support element, but rather the engagement point of the buoyancy in relation to the center of gravity for the entire revolving unit is additionally set. Static bias-tension forces may intentionally be set in the bearings of the power generation plant, in particular the bearing configurations on the support element, which reduce the bearing play and thus the tendency toward oscillations as it revolves. For such balancing out of the revolving unit, the buoyancy and weight forces of the further revolving components, in particular the water turbine and the revolving hub, are considered and/or set in relation to the support element.

The desired influence of the force balance and/or the torques engaging on the support element by the buoyancy and gravity components results through the structure selected according to the invention of the power generation plant, which associates a significantly greater buoyant volume with the revolving unit having the support element in comparison to a hub ring of an external rotor.

The internal opening in the gondola housing can be implemented by a housing part, which is implemented in the form of a bush or a hollow cylinder, for example. The generator stator is attached inside the housing part forming the internal opening and adjoins a cylindrical subsection of the radial internal wall of the internal opening. Because of the water conduction in the air gap between the generator rotor and the generator stator, a seal of the electrical components of the electrical generator is required. For this purpose, electrical insulation of the stator windings and the plate packets in the generator stator can be performed. This is performed by embedding and/or lacquering and/or a can configuration.

An embodiment of the support element having an at least sectionally cylindrical, radial outer wall is preferred. In the simplest case, one hollow cylinder is used, multiple hollow cylinders may also be placed axially adjacent to one another. A particularly simple design results if the support element has an essentially uniform radius along its axial extension. The bearing configuration advantageously rests on a large radius, which approximately corresponds to the air gap diameter of the electrical generator.

For a further embodiment of the invention, the areas of the support element which bear the generator rotor and the areas bearing the bearing configuration are at different radii. The support element can comprise a hollow cylinder, on which annular or flanged sections are placed to support components having a large radial construction. A high degree of design freedom results upon use of separate buoyant bodies. They may be situated around a cylindrical structure on the support body which takes over the actual bearing function.

The bearing configuration for the running of the support element in the internal opening of the gondola housing is preferably a radial bearing configuration, so that additional axial bearings are provided for absorbing the thrust forces, which are implemented frontally to the support element inside the internal opening according to a first embodiment. The internal opening then assumes the form of a bush. According to an alternative preferred embodiment, a separate axial bearing is situated on the front side pointing toward the outer side and thus on the outer edge of the internal opening. Alternatively, the bearing configuration on the revolving support element is implemented as a combined radial and axial bearing and assumes a conical or V-shaped embodiment, for example.

For a refinement of the invention, a disk-shaped element adjoins the support element at a first axial end pointing toward the external surroundings, whose radial extension is greater than that of the support element. The disk-shaped element lies outside the internal opening in the gondola housing. The turbine blades of the water turbine are situated along the outer circumference of the disk-shaped element. In addition, components for an axial bearing configuration are attached on the front face of the disk-shaped element pointing toward the gondola housing, which protrudes beyond the radial extension of the support element. Corresponding counter components are provided in this area on the opposing part of the gondola housing. The substantial axial thrust forces may be absorbed in axial proximity of the force introduction points of the water turbine by this measure. The described axial bearing configuration again preferably comprises water-lubricated friction bearings. Furthermore, devices for keeping out sediments may again be provided on the areas facing toward the outer side.

For an embodiment having a disk-shaped element which adjoins the support element axially, a high structural strength results for the introduction of the forces applied by the turbine blades. This is because the entire radial extension of the disk-shaped element can be implemented having a large construction, without substantially blocking the flow. The areas having a greater danger of deformation, in particular the force introduction points of the turbine blades on the disk-shaped element, are simultaneously spaced apart sufficiently far from the bearings so that they are only subject to slight deformations during operation of the plant.

For a further embodiment of the invention, the revolving support element is implemented as a double-walled hollow cylinder, which allows access from the tower-side front face of the support element through to the turbine-side front face, for example, to implement a pitch adjustment of the turbine blades. Furthermore, with a corresponding closed construction or through the association of separate buoyant bodies, a separate buoyant volume can be associated with the disk-shaped element.

The invention is explained in greater detail hereafter on the basis of exemplary embodiments in connection with schematic figures. In the following detailed figures.

Figure 1:
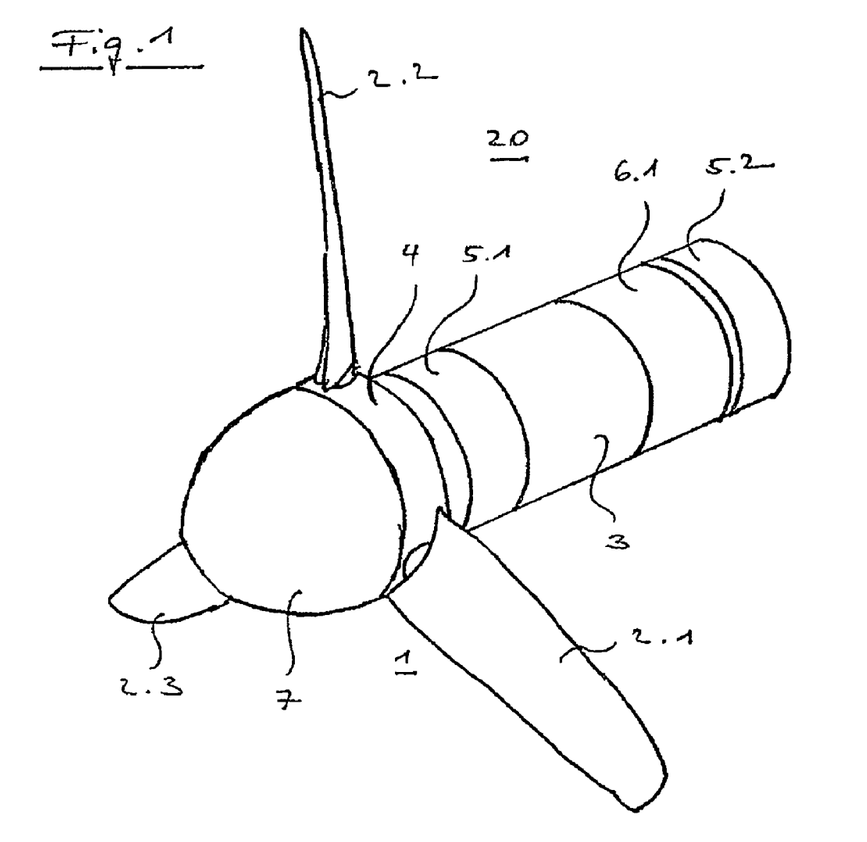
FIG. 1 shows a perspective view of the revolving unit of a power generation plant according to the invention.

FIG. 1 shows a perspective view of the revolving unit 20 of a power generation plant according to the invention, which is contacted by water on all sides. A water turbine 1 is shown, which comprises the turbine blades 2.1, 2.2, 2.3, which are attached in a propeller shape, for the embodiment shown. The turbine blades 2.1, 2.2, 2.3 are linked on a disk-shaped element 4 for the preferred embodiment shown, this connection being able to be implemented torsionally-rigid or using a blade angle adjustment mechanism.

A support element 3 axially adjoins the disk-shaped element 4. A bearing configuration is provided on the support element 3 for the running inside an internal opening in the stationary gondola housing (not shown in FIG. 1). In the present case, the peripheral components of a first radial bearing 5.1 and a second radial bearing 5.2 in the form of friction bearing components are each shown, the friction surfaces being incorporated in the areas of the walls of the support element. Furthermore, the generator rotor 6.1 is borne by the support element 3.

For a preferred embodiment, the support element 4 has a diameter such that its radial outer wall bears the generator rotor 6.1 of an electrical generator and bearing components of a bearing configuration. The support of the bearing configuration occurs directly on counter components on wall sections in the internal opening, whose internal radius leads essentially up to the air gap of the electrical generator 9 between the generator rotor 6.1 and the generator stator 6.2.

The support element can be assembled from individual cylinder segments, which adjoin one another axially. The support element preferably comprises subareas, which have a cylindrical, radial outer wall surface. It is conceivable that the subareas deviate from one another in their radial extension. These cylindrical subareas are preferably used for bearing the components of a bearing configuration associated with the support element and for supporting the generator rotor 6.1.

The components of the revolving unit shown in FIG. 1 which are connected in a torsionally rigid manner to one another are located in the water during the operation of the power generation plant. Accordingly, the generator rotor 6.1 is implemented as a wet rotor. The bearing configuration 5.1, 5.2, which is borne by the support element 3, is correspondingly implemented as a water-lubricated mount.

Furthermore, embodiments of the invention are conceivable, for which sealing lips are provided to protect the bearings against excessive introduction of sediment. However, they are not to keep out the ambient water entirely, in order to supply the ambient medium as the lubricant to the bearing configuration. Alternatively, the ambient water can be supplied to the bearing configuration from the stationary part of the power generation plant, preferably after a passage through a filter system.

An advantage of a support element 3 having a voluminous construction can be seen in that a significant buoyancy can thus be generated, which at least partially and preferably entirely compensates for the gravitational force of the revolving unit 20. This minimizes the surface pressure forces in the radial bearings, so that it is possible to use the preferred water-lubricated bearings described above. In addition, because of the uniform surface load, a mixed friction phase in the bearings during startup is run through rapidly for this bearing type. This improves the self-starting properties of a power generation plant according to the invention in particular and its revolving behavior at low flow velocities in the driving water flow.

The revolving hood 7 is shown as an additional part of the revolving unit in FIG. 1. It can also be used as a buoyant body. However, advantageously setting the force engagement pressure of the buoyancy in relation to the center of gravity of the revolving unit is only advantageously achieved by the support element 3, which is positioned axially diametrically opposite to the revolving hood 7 in relation to the water turbine 1. This is understood to mean that influence is taken on the tilting torque, which results through a spacing of the force engagement point of the buoyancy and the center of gravity. It is to be noted that for an advantageous embodiment of the invention, a fixed tilting torque is set, which is used for the purpose of defining a bias tension of the bearing configuration and in particular its radial bearing components, in order to avoid bearing oscillations during the revolving.

Figure 2:
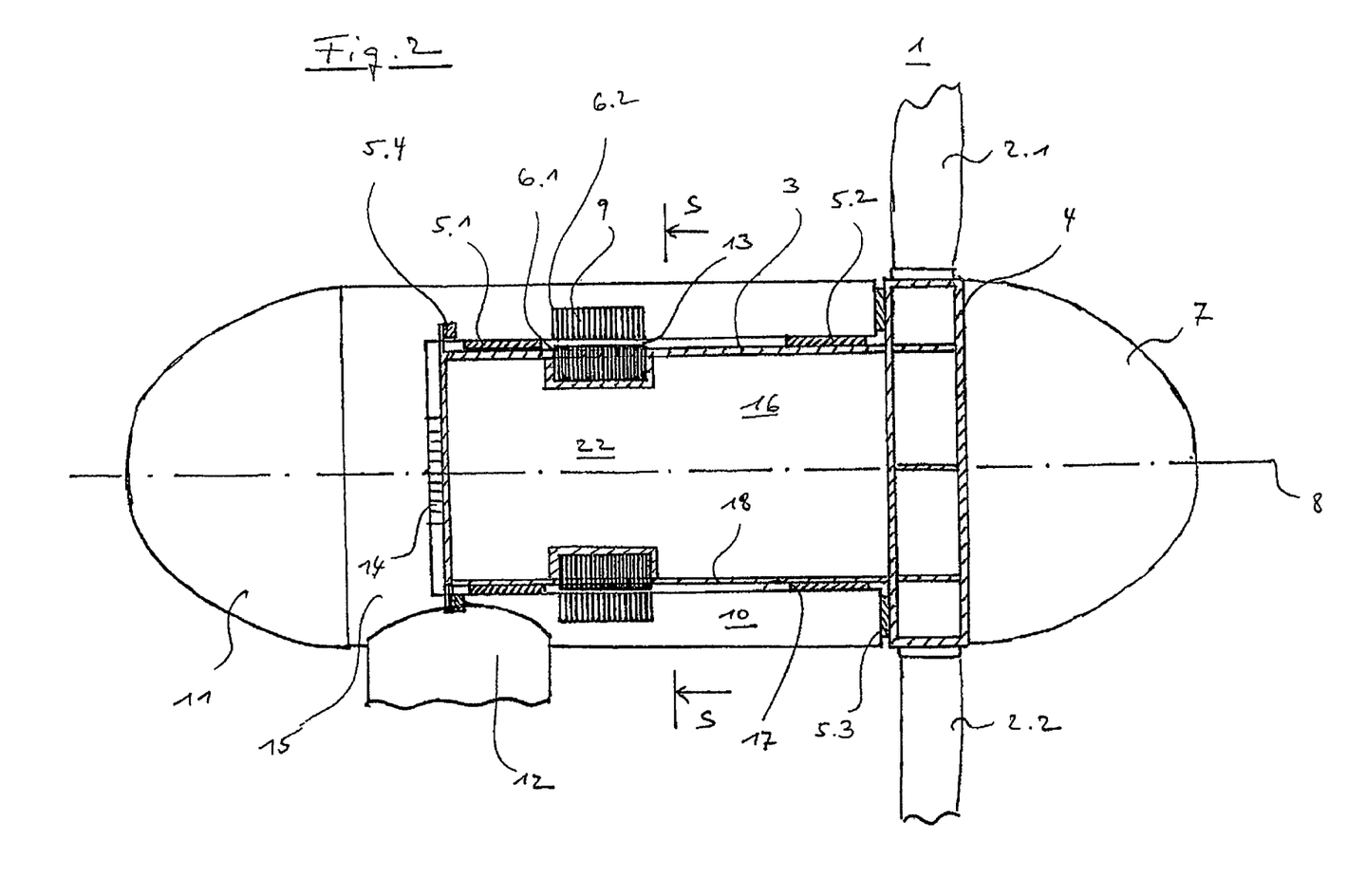
FIG. 2 shows a power generation plant according to the invention in longitudinal section.

FIG. 2 shows a section along the longitudinal axis 8 through an embodiment of a power generation plant according to the invention. The revolving unit 20 described above, comprising a water turbine 1, a disk-shaped element 4, and a support element 3, as well as a revolving hood 7, is shown in the installed state, i.e., the support element 3 is inserted inside a housing part 10 forming a cylindrical internal opening 16 and is supported against the radial internal wall of the cylindrical internal opening 16 using a bearing configuration, which has a first radial bearing 5.1 and a second radial bearing 5.2 for the present embodiment.

The intermediate area between the internal wall of the cylindrical internal opening 16 in the gondola housing 15 and the support element 3 is flooded with water. Accordingly, the ambient water is also conducted in the air gap 13 between the generator rotor 6.1 and the generator stator 6.2 of the generator. In addition, the first radial bearing 5.1 and the second radial bearing 5.2 are implemented as water-lubricated bearings.

The further bearing components which are used for supporting axial forces are attached frontally to the cylindrical internal opening 16 between the gondola housing 15 and the disk-shaped element 4 for the present exemplary embodiment. A first axial bearing 5.3 is apparent for this purpose. A second axial bearing 5.4 is provided on the axial end of the support element 3 pointing toward the bearing structure 13. For this purpose, the second axial bearing 5.4 is outlined, which absorbs the axial forces directed outward. For the windward rotor configuration shown, the substantial axial forces acting on the revolving unit 20 are pressure forces in the direction of the gondola housing 15, so that the second axial bearing 5.4 is only used as a security bearing against slipping out in the event of an incorrect inflow direction.

Furthermore, embodiments of the power generation plant according to the invention as a lee rotor are conceivable, or the water turbine 1 can have flow against it bidirectionally and a unit for tower rotation is not required. The axial bearing components are adapted accordingly to the axial forces occurring during operation. A possible embodiment for a water turbine which can have flow against it from two directions is outlined in FIG. 3, the same reference numerals being used for corresponding components. A second axial bearing 5.5 is shown, which is placed on the gondola housing side in an annular recess 19 and has dimensions corresponding to the first axial bearing 5.3. The support element 3 is supported on the second axial bearing 5.5 via a collar 21 engaging radially outward in the recess 19. Furthermore, the first axial bearing 5.3 and the second axial bearing 5.5 are situated in axial proximity to the water turbine, in order to keep deformations of the support element 3 as small as possible.

Figure 3:
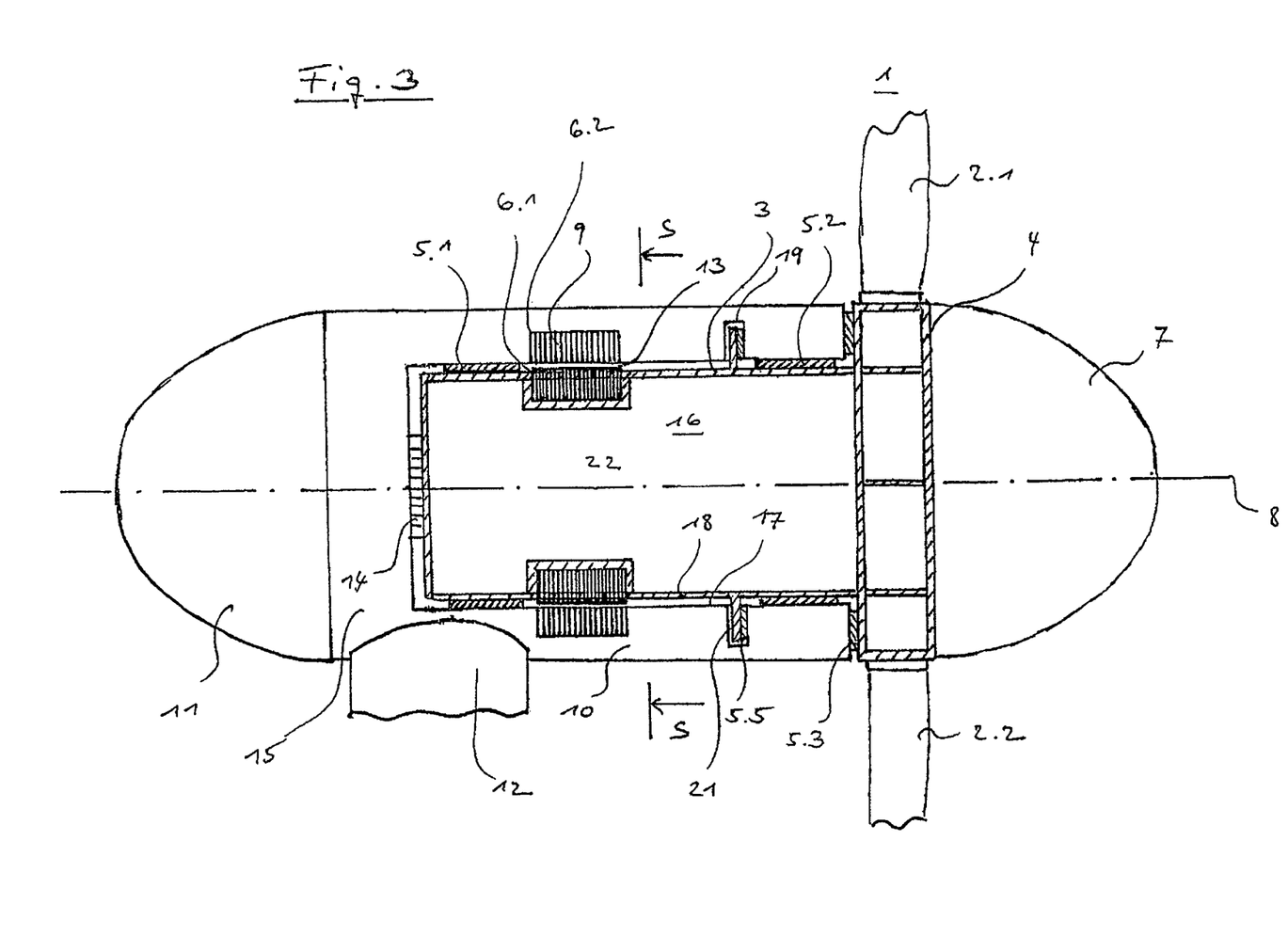
FIG. 3 shows a power generation plant according to the invention for a bidirectional inflow in longitudinal section.

For the embodiments of the invention shown in FIGS. 2 and 3, the turbine blades 2.1, 2.2 of the water turbine 1 are linked on a disk-shaped element 4, which has a torsionally-rigid connection to the support element 3 and which is connected in a torsionally rigid manner on one of the front sides of the support element 3. The disk-shaped element 4 preferably protrudes beyond the support element 3 in regard to its radial extension, so that a collar opposite to the gondola housing 15 results on the intake side of the cylindrical internal opening in the gondola housing 15. The first axial bearing 5.3 can advantageously be applied, which absorbs the thrust forces of the water turbine 1 for a windward rotor.

The disk-shaped element 4 is distinguished by a high structural rigidity because of its large radial overall size. In addition, it is preferable to implement the disk-shaped element 4 so that the deformations introduced via the turbine blades 2.1, 2.2 have no substantial influence on the areas bearing the components of the bearing configuration. Furthermore, the disk-shaped element 4 and the support element 3 may be stiffened or have a foam, which contributes to the structural rigidity. This is not shown in detail in FIG. 2.

The electrical generator 9 having the air gap 13 flooded by ambient water comprises the generator rotor 6.1 borne by the support element 3 and the generator stator 6.2 housed in the housing part 10 as the essential components. The generator rotor 6.1 and the generator stator 6.2 are electrically insulated, corresponding to the wet rotor configuration. Electrical insulation in the form of lacquers or embedding compounds comes into consideration for this purpose. Alternatively, a can, made of a nonmagnetic steel, such as an austenitic steel, may be used, for example. For further embodiments, the can is implemented using an elastomeric material and hermetically seals off the stator windings and the plate packets of the generator stator 6.2 from the surrounding water area. Corresponding seal measures may be provided for the generator rotor 6.1, if it is implemented as externally excited and bears exciter windings. Alternatively or additionally, permanent magnets are used for an advantageous embodiment.

Through the configuration of the generator 9 selected according to the invention, efficient cooling of the generator stator 6.2 pointing radially outward and the generator rotor 6.1, which is implemented as a wet rotor, is provided. The generator cooling can be improved using additional measures, such as cooling ribs on the outer side of the gondola housing 15 in the area of the generator 9. Furthermore, the use of heat conduction pipes or cooling channels, through which the ambient water is conducted, for example, is conceivable for the generator stator 6.2 and the generator rotor 6.1.

As outlined in FIG. 2, it is preferable to situate the generator 9 asymmetrically in relation to the support element 3 and to displace it toward the area of the bearing structure. An asymmetrical configuration is understood in the present case to mean that the generator 9 is situated off-center with respect to its axial location on the support element. The centrally running plane of symmetry for the support element 3 is indicated by the section line S-S in FIG. 1. The asymmetrical configuration of the generator 9 is used to displace the heavy generator toward the bearing structure 12.

Furthermore, it is possible to implement the support element 3 as having such a long axial construction that the tower slowdown of a windward rotor formed by the support structure 12 and the gondola housing 15 is reduced in the area of the water turbine 1. This is correspondingly true for the tower shadow effect with a lee rotor. At the same time, as previously described, the location of the mass center of gravity and the drive point of the buoyancy by the implementation of the support element 3, as well as the weight distribution of the revolving components can advantageously be used to influence the bearing bias tension.

Figure 4:
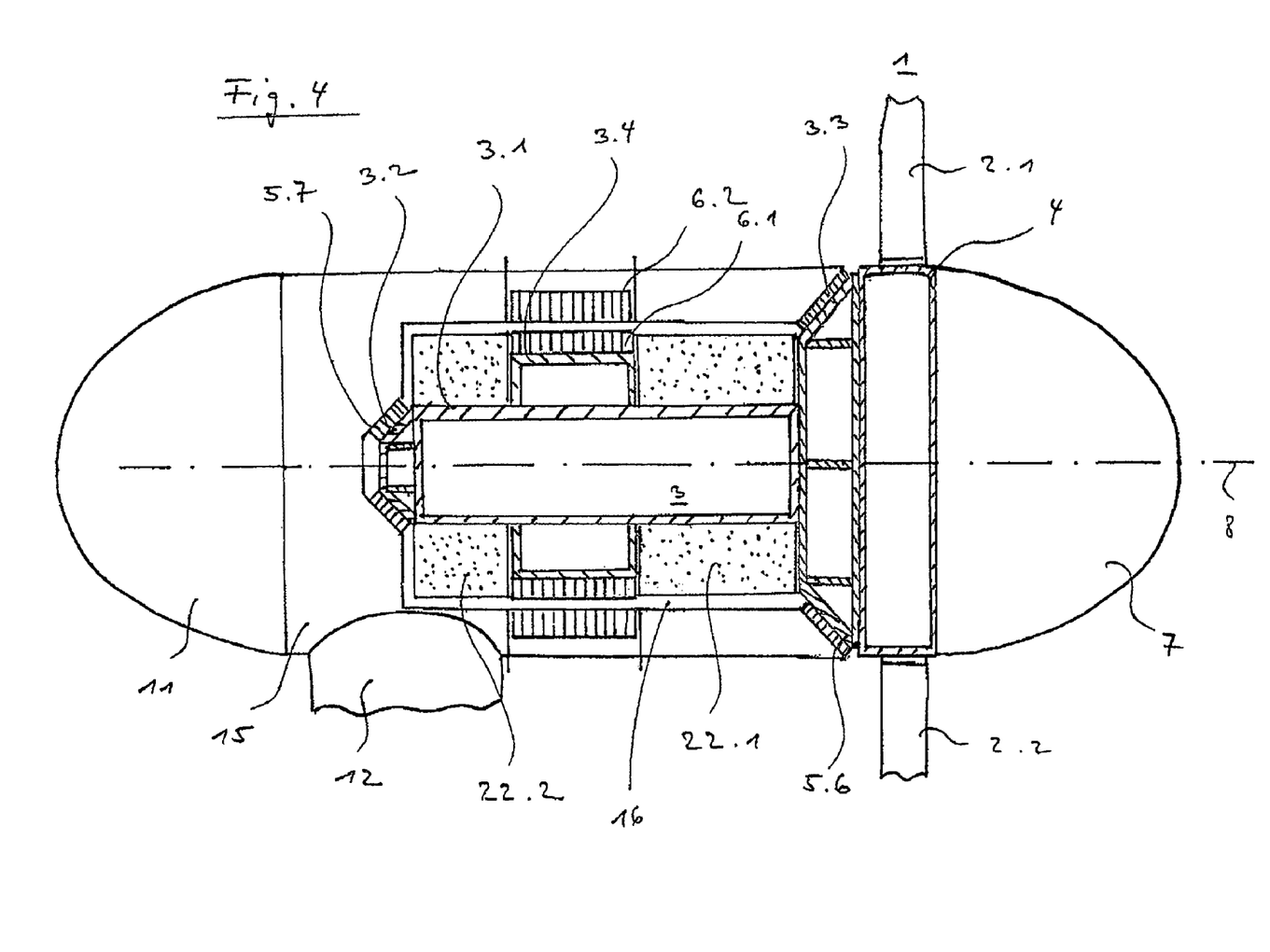
FIG. 4 shows a further embodiment of a power generation plant according to the invention having separate drive bodies.

A further embodiment is outlined in FIG. 4, for which separate buoyant bodies 22.1 and 22.2 are used, in contrast to the above-mentioned exemplary embodiments. These bodies annularly enclose a cylindrical section 3.1 of the support body and do not absorb any forces of the bearing configuration and the generator rotor. Because of the ring structure, it is not absolutely necessary to move the separate buoyant bodies 22.1, 22.2 with the revolving unit. The desired buoyancy may thus also be transmitted for a relative movement in the peripheral direction between the cylindrical section 3.1 and the separate buoyant bodies 22.1, 22.2. The separate buoyant bodies 22.1, 22.2 may be implemented as hollow bodies or may comprise a floatable material.

Furthermore, the variant of the support body 3 made of multiple individual segments shown in FIG. 4 exists, which do not necessarily have to provide sealed cavities because of the separate buoyant bodies 22.1, 22.2 and may therefore be connected to one another more simply. The support element 3 comprises, in addition to the cylindrical section 3.1, an annular section 3.4 extending radially therefrom for bearing the generator rotor 6.1. In addition, a conical section 3.2 and a second conical section 3.3 adjoin the cylindrical section 3.1 axially on both sides. Axial and radial bearings 5.6, 5.7 are applied in a V-shape thereon, which are supported on counter components on the inner walls of the internal opening 16 in the gondola housing 15.

A power generation plant according to the invention can have additional optional components. A brake 14 attached frontally on the support element 3 is shown as an example thereof in FIG. 2. Furthermore, it is conceivable to implement the support element 3 in the form of a double-walled hollow cylinder, which allows a mechanical pass-through for the pitch adjustment for the turbine blades 2.1, 2.2 to be implemented in the area near the axis, which is operated from the stationary part of the gondola housing 15. Alternatively, a pitch adjustment can be provided using a contactless power transmission unit, which operates inductively, for example. Furthermore, a speed meter and/or a detection system for determining the rotor position can be housed in the installation space on the front side of the support element 3. Further embodiments of the invention are conceivable in the context of typical measures of one skilled in the art and are delimited by the context of the following protective claims.

LIST OF REFERENCE NUMERALS

1 water turbine
2.1, 2.2, 2.3 turbine blades
3 support element
3.1 cylindrical section
3.2, 3.3 conical section
3.4 annular section
4 disk-shaped element
5.1 first radial bearing
5.2 second radial bearing
5.3 first axial bearing
5.4, 5.5 second axial bearing
6.1 generator rotor
6.2 generator stator
7 revolving hood
8 longitudinal axis
9 electrical generator
10 housing part forming an internal opening
11 stationary hood
12 bearing structure
13 air gap
14 brake
15 gondola housing
16 internal opening
17 radial inner wall
18 radial outer wall
19 annular recess
20 revolving unit
21 collar
21 buoyant volume
22.1, 22.2 separate buoyant bodies

The invention claimed is:

1. A power generation plant for obtaining electrical power from a water flow, comprising:
   a revolving unit having a water turbine;
   a directly driven electrical generator having a coaxial configuration of a generator rotor and a generator stator;
   a gondola housing having a housing part, which forms a cylindrical internal opening, and in which the generator stator is situated;
   a support element as part of the revolving unit, which is situated coaxially and radially inside the cylindrical internal opening and bears the generator rotor;
   a bearing configuration for running of the support element in the cylindrical internal opening, having bearing components, which are attached on a radial interior of the cylindrical internal opening or a radial exterior on the support element and/or are implemented on a wall area of the cylindrical internal opening or the support element;
   wherein an intermediate area between the support element and the cylindrical internal opening is flooded and the support element comprises a buoyant volume, which generates a buoyancy in a submerged state, which at least partially compensates for a weight force of the revolving unit; and
   wherein the directly driven electrical generator is situated asymmetrically in relation to a longitudinal extension of the cylindrical internal opening in the gondola housing and is displaced toward a support structure carrying the gondola housing.

2. The power generation plant according to claim 1, characterized in that the support element contributes to the buoyancy of the revolving unit in the submerged state so that a tilting torque resulting from the buoyancy and the gravity of the revolving unit to reduce a bearing play and a tendency toward oscillations as it revolves.

3. The power generation plant according to claim 2, characterized in that the support element comprises at least one hollow cylindrical section which is terminated liquid-tight.

4. The power generation plant according to claim 3, characterized in that the support element is filled in at least one subsection with a material whose density is less than that of the ambient water or at least partially comprises such a material.

5. The power generation plant according to claim 2, characterized in that the support element is filled in at least one subsection with a material whose density is less than that of the ambient water or at least partially comprises such a material.

6. The power generation plant according to claim 1, characterized in that the support element comprises at least one hollow cylindrical section which is terminated liquid-tight.

7. The power generation plant according to claim 6, characterized in that the support element is filled in at least one subsection with a material whose density is less than that of the ambient water or at least partially comprises such a material.

8. The power generation plant according to claim 1, characterized in that the support element is filled in at least one subsection with a material whose density is less than that of the ambient water or at least partially comprises such a material.

9. The power generation plant according to claim 1, characterized in that the buoyant volume comprises a separate buoyant body.

10. The power generation plant according to claim 1, characterized in that the housing part forming the cylindrical internal opening is implemented as a hollow cylinder or in the form of a bush.

11. The power generation plant according to claim 1, characterized in that the housing part forming the cylindrical internal opening is implemented in the form of multiple ring elements adjoining one another, the generator stator being received in one of the ring elements.

12. The power generation plant according to claim 1, characterized in that the water turbine comprises a disk-shaped element, on which multiple turbine blades are fastened, the diskshaped element being connected in a torsionally rigid manner to the support element and protruding radially beyond it.

13. The power generation plant according to claim 12, characterized in that the disk-shaped element is supported using a water-lubricated first axial bearing against a front face of the housing part forming the cylindrical internal opening.

14. The power generation plant according to claim 1, characterized in that the generator stator and/or the generator rotor are encapsulated water-tight.

15. The power generation plant according to claim 14, characterized in that a can configuration and/or an electrical insulation made of a corrosion-resistant, nonmagnetic material and particularly preferably a corrosion-resistant, non-ferromagnetic material is used for the encapsulation of the generator stator and/or the generator rotor.

16. The power generation plant according to claim 1, characterized in that the generator rotor comprises permanent magnets and/or a configuration for external excitation, to which contactless exciter power is supplied from the stationary part of the power generation plant.

17. The power generation plant according to claim 1, characterized in that the support element has a passage in the axial direction along the longitudinal axis, in which a mechanical adjustment mechanism is applied for the angle setting (pitch) of a plurality of turbine blades of the water turbine.

* * * * *